United States Patent
Mayer

(10) Patent No.: US 9,798,994 B2
(45) Date of Patent: Oct. 24, 2017

(54) LOGISTICS SYSTEM FOR MANAGING THERMAL CONDITIONING OF UNIT LOADS OF PCM PANELS AND METHOD OF USE

(71) Applicant: MINNESOTA THERMAL SCIENCE, LLC, Plymouth, MN (US)

(72) Inventor: William T. Mayer, Stacy, MN (US)

(73) Assignee: PELICAN BIOTHERMAL LLC, Plymouth, MN (US)

( * ) Notice: Subject to any disclaimer, the term of this patent is extended or adjusted under 35 U.S.C. 154(b) by 784 days.

(21) Appl. No.: 14/188,395

(22) Filed: Feb. 24, 2014

(65) Prior Publication Data

US 2015/0241120 A1    Aug. 27, 2015

(51) Int. Cl.
| | | |
|---|---|---|
| F25B 49/00 | (2006.01) |
| G06Q 10/08 | (2012.01) |
| G06Q 50/28 | (2012.01) |
| F25D 3/06 | (2006.01) |

(52) U.S. Cl.
CPC ............. *G06Q 10/08* (2013.01); *G06Q 50/28* (2013.01); *F25D 3/06* (2013.01)

(58) Field of Classification Search
CPC .......... G06Q 50/28; G06Q 10/08; F25D 3/06; C09K 5/06; F28D 20/02
See application file for complete search history.

(56) References Cited

U.S. PATENT DOCUMENTS

| | | |
|---|---|---|
| 6,482,332 B1 | 11/2002 | Malach |
| 7,516,600 B1 | 4/2009 | Flora |
| 7,908,870 B2 | 3/2011 | Williams et al. |
| 2002/0099567 A1 | 7/2002 | Joao |
| 2004/0151851 A1 | 8/2004 | Miller |
| 2004/0194471 A1* | 10/2004 | Rickson ............... H04L 67/025 62/3.6 |
| 2006/0064147 A1* | 3/2006 | Almqvist ................ A61F 7/02 607/108 |
| 2008/0114487 A1 | 5/2008 | Schuler et al. |
| 2008/0135564 A1* | 6/2008 | Romero ............ B65D 81/3827 220/592.2 |
| 2012/0197810 A1 | 8/2012 | Haarmann et al. |
| 2013/0265139 A1* | 10/2013 | Nummila ............... G01K 1/024 340/10.1 |

(Continued)

FOREIGN PATENT DOCUMENTS

| | | |
|---|---|---|
| EP | 1420573 A2 | 5/2004 |
| WO | 03/073030 A1 | 9/2003 |
| WO | 2008/137883 A1 | 11/2008 |

(Continued)

OTHER PUBLICATIONS

Swedberg, Claire; "Wake Forest Baptist Develops System for Tracking Blood Temperature", www.rfidjournal.com/articlws/view?8708/2. Aug. 17, 2011.

*Primary Examiner* — Frantz Jules
*Assistant Examiner* — Steve Tanenbaum
(74) *Attorney, Agent, or Firm* — Sherrill Law Offices, PLLC

(57) ABSTRACT

A logistics system for monitoring and signaling the thermal condition of unit loads of PCM panels during a thermal conditioning cycle as between deep frozen, thermally dampened frozen, and thermally spent, and method of managing thermal conditioning of PCM panels utilizing such signals.

41 Claims, 4 Drawing Sheets

(56) References Cited

U.S. PATENT DOCUMENTS

2013/0289927 A1   10/2013   Smith et al.

FOREIGN PATENT DOCUMENTS

| WO | 2009042640 A2 | 4/2009 |
| WO | 2010091217 A2 | 8/2010 |
| WO | 2011116076 A1 | 9/2011 |
| WO | 2012155254 A1 | 11/2012 |

* cited by examiner

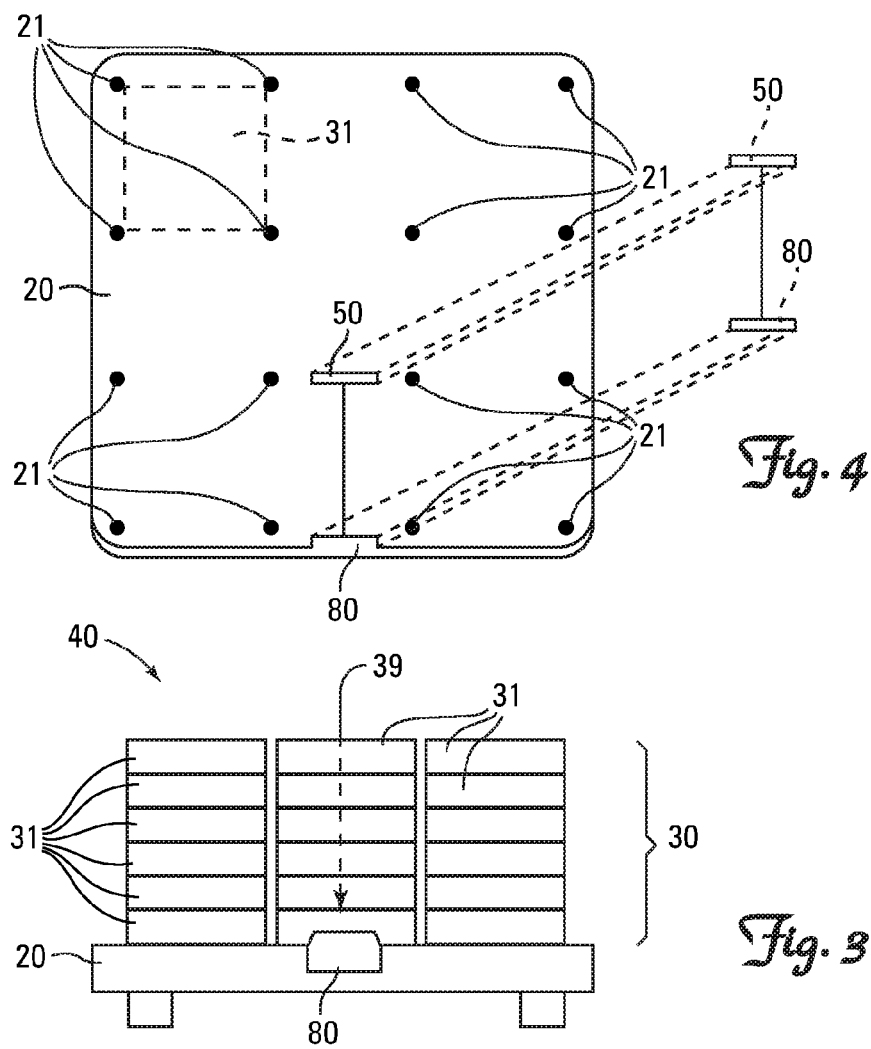
Fig. 4
Fig. 3
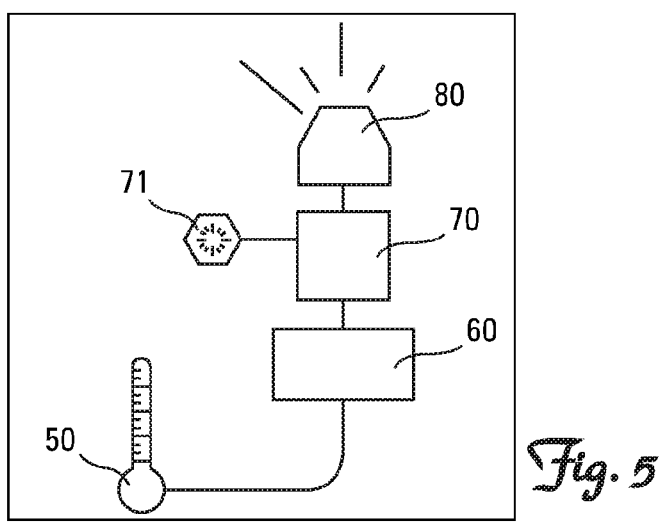
Fig. 5

| Pallet | | T | Thermal Condition |
|---|---|---|---|
| No. | Location | | |
| 27 | Container Assembly | 0°C | $S_2$ 39 min |
| 35 | Freezer | -15°C | $S_1$ |
| 06 | Refrig | -9°C | $S_1$ |
| 12 | Refrig | -2°C | $S_2$ 3 min |
| 01 | Refrig | 6°C | $S_3$ |
| 19 | Refrig | 2°C | $S_3$ >3 hrs @ $S_2$ |

LOGISTICS SYSTEM FOR MANAGING THERMAL CONDITIONING OF UNIT LOADS OF PCM PANELS AND METHOD OF USE

BACKGROUND

Thermally controlled shipping containers typically employ panels filled with a phase change material (PCM panels) for achieving prolonged thermal control of the thermally insulated payload retention chamber at or near the phase change temperature of the PCM.

Prior to deployment in a shipping container, PCM panels must be thermally conditioned meaning the PCM panels must be frozen, typically by placement in a freezer maintained at a temperature well below the freezing point of the PCM, and then thermally dampened to a temperature proximate the melt temperature of the PCM, typically by placement in a refrigerator maintained at a temperature slightly above the melt temperature of the PCM. Thermal damping is necessary as many of the thermally labile payloads shipped with such containers need to be maintained within a temperature range as they are susceptible to thermal degradation if exposed to temperatures that are either too cold or too hot. Failure to thermally dampen the frozen PCM panels before they are deployed in a shipping container can result in a payload retention chamber cooled below the desired temperature range.

It is also important to avoid excessive thermal damping of the PCM panels as it results in premature phase change of the PCM and concomitant loss of thermal value.

Accordingly, a substantial need exists for a logistics system and method for optimizing the thermal conditioning of PCM panels throughout the freeze and thermal dampening process.

SUMMARY OF THE INVENTION

A first aspect of the invention is a thermal conditioning logistics system.

A first embodiment of the first aspect of the invention is a thermal conditioning logistics system for use with a pallet supporting a unit load of PCM panels configured and arranged to form an environmental microcosm whose temperature is governed by the temperature of the unit load of PCM panels on the pallet. The system includes a temperature sensor, an electronic data capture component, and an electronic data processing and display control unit. The temperature sensor is operable for periodically measuring the temperature of an environmental microcosm formed by a unit load of PCM panels supported on a pallet, and electronically transmitting such measured temperature values. The electronic data capture component is operable for receiving and recording the periodically measured temperature values transmitted by the temperature sensor. The electronic data processing and display control unit is configured, arranged and programmed to generate (a) a human perceptible first signal when the measured temperature is several degrees below a threshold temperature indicative of a deep frozen unit load of PCM panels on the pallet, and (b) a human perceptible second signal when the measured temperature is proximate the threshold temperature indicative of a thermally-dampened unit load of frozen PCM panels on the pallet.

A second embodiment of the first aspect of the invention is a thermal conditioning logistics system for PCM panels that includes a pallet, a temperature sensor, an electronic data capture component, and an electronic data processing and display control unit. The pallet is operable for supporting a unit load of PCM panels configured and arranged to form an environmental microcosm whose temperature is governed by the temperature of the unit load of PCM panels on the pallet. The temperature sensor is operable for periodically measuring the temperature of an environmental microcosm in thermal communication with the sensor and electronically transmitting such measured temperature values. The sensor is configured and arranged for integration into a unit load of PCM panels on the pallet whereby the temperature of the environmental microcosm in thermal communication with an integrated temperature sensor is governed by the temperature of the unit load of PCM panels. The electronic data capture component is operable for receiving and recording the periodically measured temperature values transmitted by the temperature sensor. The electronic data processing and display control unit is configured, arranged and programmed to generate (a) a human perceptible first signal when the measured temperature is several degrees below a threshold temperature indicative of a deep frozen unit load of PCM panels on the pallet, and (b) a human perceptible second signal when the measured temperature is proximate the threshold temperature indicative of a thermally-dampened unit load of frozen PCM panels on the pallet.

The data processing and display control unit is preferably further configured, arranged and programmed to provide a human perceptible third signal when the measured temperature is several degrees above the threshold temperature indicative of a thermally spent unit load of PCM panels on the pallet.

The data processing and display control unit also preferably includes a system clock, and is programmed to provide a human perceptible third signal when the measured temperature has been proximate or greater than the threshold temperature for a time period longer than a threshold durational value.

The system of preferably includes a display controlled by the display control unit. The display can be configured and arranged for display of the human perceptible signals generated by the data processing and display control unit. The display can be physical attached to or integrated with a pallet such that the display is default transportable with the pallet, unattached but in physical proximity to the pallet, or remote from the pallet when provided with the capability of correlating a display of the human perceptible signals generated by the data processing and display control unit with an identification of the associated pallet.

A second aspect of the invention is a method for thermal management of PCM panels employing the logistics system of the first aspect of the invention.

The second aspect of the invention includes the steps of (A) obtaining a thermal conditioning logistics system in accordance with the first aspect of the invention, (B) stacking a unit load of PCM panels containing a phase change material having a known melt temperature onto a pallet so as to form an environmental microcosm whose temperature is governed by the temperature of the unit load of PCM panels on the pallet, (C) placing the temperature sensor into thermal communication with the environmental microcosm to form a complete pallet, (D) setting the threshold temperature to a temperature proximate the melt temperature of the phase change material in the PCM panels stacked on the pallet, (E) placing the complete pallet in a freezer unit set to a temperature several degrees below the threshold temperature for purposes of forming a deep frozen unit load of PCM panels on the complete pallet, (F) transporting the complete pallet from the freezer unit to a refrigerator unit set to a temperature capable of thermally-dampening deep frozen PCM panels, after the thermal conditioning logistics system generates the human perceptible first signal indicating that the unit load of PCM panels on the complete pallet is a deep frozen unit load of PCM panels, and (G) transporting the complete pallet from the refrigerator unit to an assembly area for utilization in a shipping container, after the thermal conditioning logistics system generates the human perceptible second signal indicating that the unit load of PCM panels on the complete pallet is a thermally-dampened unit load of frozen PCM panels.

When the selected thermal conditioning logistics system in accordance with the first aspect of the invention includes the ability to provide a human perceptible third signal, step (G) may include the option of transporting the complete pallet from the refrigerator unit to one of (i) an assembly area for utilization in a shipping container provided the thermal conditioning logistics system has generated the human perceptible second signal indicating that the unit load of PCM panels on the complete pallet is a thermally-dampened unit load of frozen PCM panels, and has not generated the human perceptible third signal indicating that the unit load of PCM panels on the complete pallet is a thermally spent unit load of PCM panels, and (ii) the freezer unit when the thermal conditioning logistics system has generated the human perceptible third signal indicating that the unit load of PCM panels on the complete pallet is a thermally spent unit load of PCM panels.

The threshold temperature is preferably set at the melt temperature of the phase change material in the PCM panels stacked on the complete pallet, and the refrigerator unit set to a temperature proximate the threshold temperature.

BRIEF DESCRIPTION OF THE DRAWINGS

FIG. 3 is a front orthographic view of one embodiment of a palletized unit load of PCM panels in accordance with the invention.

FIG. 4 is a top orthographic view of one embodiment of a pallet in accordance with the invention, depicting an integrated data capture, processing and display units and the options of a separate attachable and detachable temperature sensor and a separate attachable and detachable display.

FIG. 5 is a schematic diagram of one embodiment of a physically integrated unitary combination of an on-board data generation, capture, processing and display unit in accordance with the invention.

DETAILED DESCRIPTION OF A PREFERRED EMBODIMENT

Definitions

Figure 1:
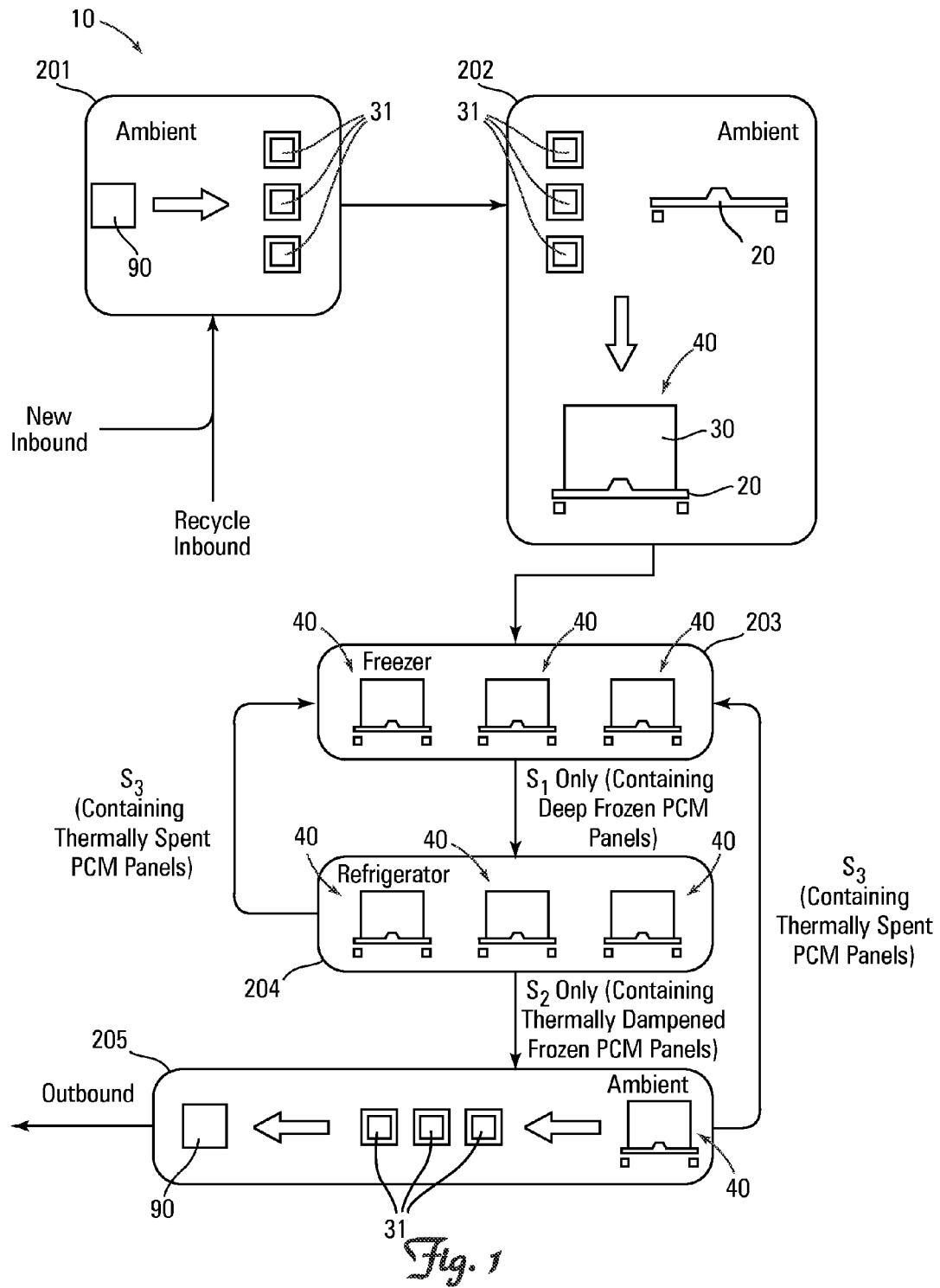
FIG. 1 is a process flow diagram for one embodiment of the invention.

As used herein, including the claims, the term "pallet" is used expansively and inclusively to encompass any structural foundation for a unit load.

As used herein, including the claims, the terms "govern" and "governed" mean to prevail or have decisive influence.

As used herein, including the claims, the phrase "PCM panels", means a panel containing a solid-liquid phase change material.

As used herein, including the claims, the phrase "deep frozen unit load of PCM panels", means PCM panels having a temperature at least several degrees below the melting point of the phase change material in the PCM panels.

As used herein, including the claims, the phrase "thermally-dampened unit load of frozen PCM panels", means PCM panels containing predominantly frozen phase change material whose temperature is at or within a few degrees of the melting point of the phase change material.

As used herein, including the claims, the phrase "thermally spent unit load of PCM panels", means PCM panels containing significant liquid phase change material.

As used herein, including the claims, the term "proximate", when used to refer to a temperature, means within 2° C.

As used herein, including the claims, the term "default", means occurring unless a change is made to effect another outcome.

Nomenclature
10 Thermal Conditioning Logistics System
20 Pallet
21 Registration Elements
22 Pallet ID Tag
30 Unit Load of Phase Change Material Panels (PCM Panels)
$30_1$ Deep Frozen Unit Load of PCM Panel
$30_2$ Thermally Dampened Frozen Unit Load of PCM Panels
$30_3$ Thermally Spent Unit Load of PCM Panels
31 Individual PCM Panels
$31_1$ Deep Frozen PCM Panel
$31_2$ Thermally Dampened Frozen PCM Panels
$31_3$ Thermally Spent PCM Panels
39 Environmental Microcosm
40 Palletized Unit Load of PCM Panels
50 Temperature Sensor
60 Data Capture Component
70 Data Processing and Display Control Unit
71 System Clock
80 Display
90 Shipping Container (Assembled)
201 PCM Panel Storage Area (Ambient)
202 PCM Panel Palletization Area (Ambient)
203 Freezer Unit
204 Refrigerator Unit
205 Shipping Container Assembly Area (Ambient)
$S_1$ First Signal (Deep Frozen)
$S_2$ Second Signal (Thermally Dampened Frozen)
$S_3$ Third Signal (Thermally Spent)
T Temperature
$T_{Thrshd}$ Threshold Temperature
t Time
$t_{Thrshd}$ Threshold Time Period
System A first aspect of the invention is a thermal conditioning logistics system 10 for use with a palletized unit load of PCM panels 40. Referring generally to FIGS. 3-6, a preferred embodiment of the system 10 includes at least a temperature sensor 50, an electronic data capture component 60, and an electronic data processing and display control unit 70.

The palletized unit load of PCM panels 40 includes a pallet 20 supporting a unit load of PCM panels 30 formed from a plurality of individual PCM panels 31. The individual PCM panels 31 are configured and arranged in the unit load of PCM panels 30 so as to create an environmental microcosm 39 embedded within the unit load of PCM panels 30 such that temperature of the microcosm 39, while not necessarily closed off from the surrounding environment, is governed by the temperature of the PCM panels 30 forming the unit load of PCM panels 30.

Referring to FIG. 4, the pallet 20 may include registration elements 21, such as properly positioned upward projecting pins or bumps, to encourage or mandate a predefined arrangement of the individual PCM panels 31 on the pallet 20 and thereby create the environmental microcosm 39 in a defined location within the unit load of PCM panels 30.

Figures 6, 7:
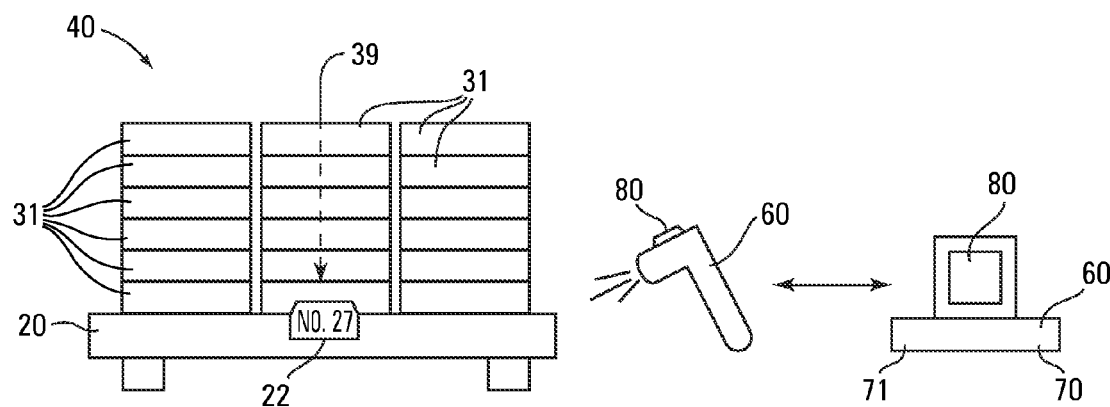
FIG. 6 is a schematic diagram of an embodiment of a workstation-based data generation, capture, processing and display unit in accordance with the invention.
FIG. 7 is an exemplary screen display on a workstation-based embodiment of the invention.

Referring generally to FIG. 6, each pallet 20 preferably includes some type of an ID tag 22 to facilitate reference to and identification of each pallet 20 and thereby each palletized unit load of PCM panels 40. The ID tag 22 may be selected from any of the well known human and electronically perceptible ID tags such as a metal plate or adhesive label bearing a human perceptible unique identifier and/or a Barcode secured to the pallet 20, an RFID tag attached to the pallet 20, etc.

Referring to FIGS. 4 and 5, the temperature sensor 50 is positioned and operable for periodically measuring the temperature T of the environmental microcosm 39 formed in a unit load of PCM panels 30, and wired or wirelessly electronically transmitting such measured temperature values T. Any of the well-known temperature sensors may be employed in the invention. Temperature sensors particularly well suited for use in the invention are RFID temperature sensors such as those available from Texas Instruments of Dallas, Tex. and Phase IV Engineering, Inc. of Boulder, Colo.

The electronic data capture component 60 is operable for receiving and recording the periodically measured temperature values T transmitted by the temperature sensor 50.

Figure 2:
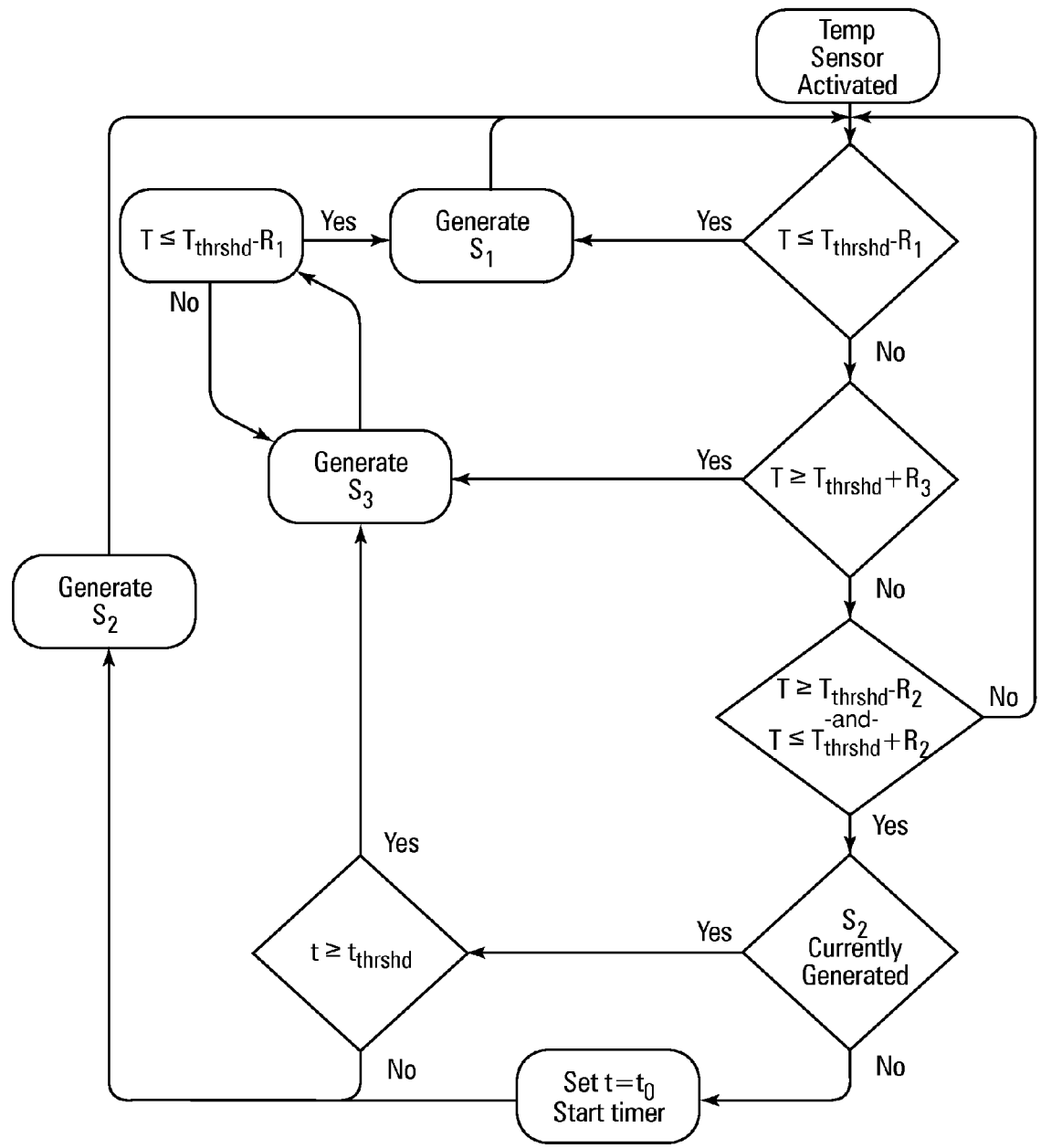
FIG. 2 is a signal generation flow chart for one embodiment of the invention.

Referring to FIG. 2, the electronic data processing and display control unit 70 is in electrical communication with the electronic data capture component 60, and is configured, arranged and programmed to generate (a) a human perceptible first signal $S_1$ when the measured temperature T is several degrees below a threshold temperature $T_{Thrshd}$ indicative of a deep frozen unit load of PCM panels $30_1$, and (b) a human perceptible second signal $S_2$ when the measured temperature T is proximate the threshold temperature $T_{Thrshd}$ indicative of a thermally-dampened unit load of frozen PCM panels $30_2$. The electronic data processing and display control unit 70 is also preferably programmed to generate (c) a human perceptible third signal $S_3$ when the measured temperature T is several degrees above the threshold temperature $T_{Thrshd}$ indicative of a thermally spent unit load of PCM panels $30_3$.

The data processing and display control unit 70 also preferably includes a system clock 71, and is programmed to provide the human perceptible third signal $S_3$ when the measured temperature T has been proximate or greater than the threshold temperature $T_{Thrshd}$ for a time period t longer than a threshold durational value $t_{Thrshd}$ indicative of a load of PCM panels 30 that, while not necessarily thermally spent, is likely to be excessively or nearly thermally spent due to the amount of time it has been exposed to temperatures T above the melt temperature of the PCM.

Referring to FIG. 2, the data processing and display control unit 70 is programmed to receive temperature readings T from the temperature sensor 50 and compare those temperatures T to a threshold temperature $T_{Thrshd}$ for determining which, if any, of the thermal status signals $S_1$, $S_2$ and $S_3$ to generate and display or otherwise report. The threshold temperature $T_{Thrshd}$ should be set or selected to approximate the melt temperature of the PCM contained in the PCM panels 31 forming the environmental microcosm 39 whose temperature is being monitored by the temperature sensor 50 so that the signals $S_1$, $S_2$ and $S_3$ will provide an appropriate indication of the thermal status of the PCM panels 31 as between deep frozen PCM panels $31_1$, thermally dampened frozen PCM panels $31_2$ and thermally spent PCM panels $31_3$.

Upon activation of the system 10, temperature readings T generated by the temperature sensor 50 are compared to an appropriate threshold temperature $T_{Thrshd}$. If found to be at or below the threshold temperature $T_{Thrshd}$ by a predetermined amount $R_1$ (e.g, $T \leq T_{Thrshd} - R_1$) the system 10 generates a first signal $S_1$ to indicate that the associated PCM panels 31 are deep frozen PCM panels $31_1$. The system 10 continues to generate the deep frozen $S_1$ signal so long as the temperature readings T remain at or below the threshold temperature $T_{Thrshd}$ by the predetermined amount $R_1$.

If found to be above the threshold temperature $T_{Thrshd}$ by a predetermined amount $R_3$ (e.g., $T \geq T_{Thrshd} + R_3$) the system 10 generates a third signal $S_3$ to indicate that the associated PCM panels 31 are thermally spent PCM panels $31_3$. The system 10 continues to generate the thermally spent signal $S_3$ until the temperature readings T fall to the threshold temperature $T_{Thrshd}$ by the predetermined amount $R_1$ indicative of deep frozen PCM panels $31_1$, at which time the system 10 generates the first signal $S_1$ to indicate that the associated PCM panels 31 are deep frozen PCM panels $31_1$.

If found to be within a predetermined amount $R_2$ above and/or below the threshold temperature $T_{Thrshd}$ the system 10 generates a second signal $S_2$ to indicate that the associated PCM panels 31 are thermally dampened frozen PCM panels $31_2$ suitable for incorporation into a shipping container 90. The value of $R_2$ can be the same or different dependent upon whether the variance is above or below the threshold temperature $T_{Thrshd}$. The system 10 continues to generate the frozen thermally dampened signal $S_2$ unless and until either (i) a temperature reading T falls outside the acceptable temperature range, or (ii) when the system 10 includes a system clock 71 and is programmed with the optional timing module, the frozen thermally dampened signal $S_2$ has been generated for a time period t longer than a predetermined threshold time $t_{Thrshd}$ indicative of excessively thermally spent load of PCM panels 31, at which time the system 10 generates the thermally spent signal $S_3$ to indicate that the associated PCM panels 31 are thermally spent PCM panels $31_3$ unsuitable for incorporation into a shipping container 90.

The values for $R_1$, $R_2$ and $R_3$ may be set as desired, but generally acceptable and satisfactory ranges are provided in Table One below.

The electronic data capture component 60 and electronic data processing and display control unit 70 can be integrated into and provided on-board each pallet 20, such depicted in FIGS. 3-5, and/or may be provided separate from the pallets 20 such as depicted in FIG. 6 as a mobile, hand-held device and/or a stationary remote workstation. Referring generally to FIG. 5, the temperature sensor 50, data capture component 60, and data processing and display control unit 70 can be physically integrated into a single unitary element for integration into or attachment to a pallet 20.

A display 80, controlled by the display control unit 70, is preferably provided to display the human perceptible signals $S_1$, $S_2$ and $S_3$ generated by the data processing and display control unit 70. The display 80 can be physical attached to or integrated with each pallet 20, such as depicted in FIGS. 3 and 4, unattached but in physical proximity to the pallet 20, such as the hand-held unit depicted in FIG. 6, or remote from the pallet 20, such as the workstation depicted in FIG. 6 provided the remote display 80 includes the capability of correlating display of the human perceptible signals $S_1$, $S_2$ and $S_3$ with an identification of the associated pallet 20 such as depicted in FIG. 7.

The human perceptible signals $S_1$, $S_2$ and $S_3$ can be audible (varying tones), visible (varying color, alphanumeric text and/or flashing) and/or tactile (varying vibration) signals. The human perceptible signals $S_1$, $S_2$ and $S_3$ preferably include at least a visible component, most preferably a color coded visual signal or cue as outlined below in Table One.

TABLE ONE

| SIGNAL | SIGNIFICANCE | ALGORITHYM | COLOR CODE |
|---|---|---|---|
| $S_1$ | Indicative of Deep Frozen Unit Load of PCM Panels | $T \leq T_{Thrshd} - R_1$ wherein $R_1$ is between 2°-60° C., preferably between 10°-50° C. and most preferably between 20°-40° C. | Blue |
| $S_2$ | Indicative of Thermally-Dampened Unit Load of Frozen PCM Panels | $T \geq T_{Thrshd} - R_2$ -and- $T \leq T_{Thrshd} + R_2$ wherein each $R_2$ is independently between 1°-5° C., preferably between 1°-3° C. and most preferably between 1°-2° C. | Green |
| $S_3$ | Indicative of Thermally Spent Unit Load of PCM Panels | $T \geq T_{Thrshd} + R_3$ wherein $R_3$ is between 2°-10° C., preferably between 2°-7° C. and most preferably between 2°-5° C. | Red |

Method

Referring to FIG. 1, a second aspect of the invention is a method for thermal management of PCM panels 31 employing the logistics system 10 of the first aspect of the invention.

The method requires a supply of pallets 20, PCM panels 31 and a thermal conditioning logistics system 10 such as depicted in FIG. 1 at PCM panel storage area or station 201 and PCM panel palletization area or station 202, both of which can be maintained at ambient or room temperatures.

PCM panels 31 containing a phase change material having a known melt temperature are stacked onto a pallet 20 at the PCM panel palletization station 202 so as to form a unit load of PCM panels 30 on the pallet 20 that defines an environmental microcosm 39 whose temperature is governed by the temperature of the unit load of PCM panels 30. The temperature sensor 50 is placed into thermal sensing communication with the environmental microcosm 39. The threshold temperature $T_{Thrshd}$ is set or selected to a temperature proximate the melt temperature of the phase change material in the PCM panels 31 forming the palletized unit load of PCM panels 40 (e.g., 0° C.±2° C. when the PCM material is water) and the temperature sensor 50 activated.

The palletized unit load of PCM panels 40 complete with temperature sensor 50 is placed within a freezer unit 203 set to a temperature several degrees below the threshold temperature $T_{Thrshd}$ (e.g., −20° C. when the PCM material is water) for purposes of freezing the PCM material and forming a palletized unit load of PCM panels 40 containing a deep frozen unit load of PCM panels $30_1$. Referring to FIG. 2, when the temperature sensor 50 senses a temperature indicative of deep frozen PCM panels $31_1$ (e.g., ≤−5° C. when the PCM material is water) the logistics system 10 generates a first signal $S_1$ to indicate that the unit load of PCM panels 30 on the pallet 20 is a deep frozen unit load of PCM panels $30_1$.

Palletized unit loads of PCM panels 40 identified as deep frozen by a deep frozen signal $S_1$ may, as needed, be transported from the freezer unit 203 to a refrigerator unit 204 set to a temperature several degrees above the threshold temperature $T_{Thrshd}$ (e.g., 5° C. when the PCM material is water) for providing tempered and controlled thermal dampening of the unit load of deep frozen PCM panels $30_1$ to form a unit load of thermally dampened frozen PCM panels $30_2$. Referring again to FIG. 2, when the temperature sensor 50 senses a temperature indicative of thermally dampened frozen PCM panels $31_2$ (e.g., −2° C.±1° C. when the PCM material is water) the logistics system 10 generates a second signal $S_2$ to indicate that the unit load of PCM panels 30 on the pallet 20 is a thermally dampened frozen unit load of PCM panels $30_2$.

Palletized unit loads of PCM panels 40 identified as thermally dampened by a thermally dampened signal $S_2$ may, as needed, be transported from the refrigerator unit 204 to a shipping container assembly area or station 205 for use of the thermally dampened frozen PCM panels $31_2$ in assembly of thermally controlled shipping containers 90.

Referring to FIG. 2, in a preferred embodiment when the temperature sensor 50 embedded within a thermally dampened frozen unit load of PCM panels $30_2$, whether located in the freezer unit 203, refrigerator unit 204, shipping container assembly area 205, or elsewhere, senses a temperature indicative of a thermally spent PCM panels $31_3$ (e.g., ≥3° C. when the PCM material is water) the logistics system 10 generates a third signal $S_3$ to indicate that the unit load of PCM panels 30 on the pallet 20 is a thermally spent unit load of PCM panels $30_3$ which is unsuitable for use in assembly of thermally controlled shipping container 90 and in need of thermal conditioning through the freeze and thermal dampening cycle before the PCM panels 31 can be used in assembly of thermally controlled shipping containers 90.

Referring to FIG. 2, when the logistics system 10 includes a system clock 71 and is programmed with the optional timing module, the thermally dampened signal $S_2$ will also be changed to the thermally spent signal $S_3$ whenever the thermally dampened signal $S_2$ has been generated for a time period t longer than a predetermined threshold time $t_{Thrshd}$ (e.g., 48 hours assuming each unit load of thermally dampened frozen PCM panels $30_2$ is deployed in the assembly of shipping containers 90 promptly after removal from the refrigerator unit 204) suggestive of an excessively thermally spent load of refrigerated PCM panels $31_3$ at which time the system 10 generates the thermally spent signal $S_3$ to indicate that the associated PCM panels 31 are thermally spent PCM panels $31_3$ unsuitable for incorporation into a shipping container 90 and in need of thermal conditioning through the freeze and thermal dampening cycle before the PCM panels 31 can be used in assembly of thermally controlled shipping containers 90.

As referenced previously, the threshold temperature $T_{Thrshd}$ need not but preferably is set at or very near the melt temperature of the phase change material in the PCM panels 31 forming the microcosm 39 whose temperature is monitored by the temperature sensor 50, and the refrigerator unit 204 set to a temperature slightly (e.g., 5° to 10° C.) above the threshold temperature $T_{Thrshd}$.

I claim:

1. A thermal conditioning logistics system for use with a pallet supporting a unit load of PCM panels configured and arranged to form an environmental microcosm whose temperature is governed by the temperature of the unit load of PCM panels on the pallet, the system comprising:

(a) a temperature sensor operable for periodically measuring the temperature of an environmental microcosm formed by a unit load of PCM panels supported on a pallet, and electronically transmitting such measured temperature values, (b) an electronic data capture component operable for receiving and recording the periodically measured temperature values transmitted by the temperature sensor, and (c) an electronic data processing and display control unit configured, arranged and programmed to compare the measured temperature to a threshold temperature value representative of a temperature at which a given phase change material transitions from deep frozen phase change material to thermally-dampened phase change material, and generate (i) a human perceptible first signal when the measured temperature is indicative of a deep frozen unit load of PCM panels on the pallet, and (ii) a human perceptible second signal when the measured temperature is indicative of a thermally-dampened unit load of frozen PCM panels on the pallet.

2. The system of claim 1 wherein the data processing and display control unit is further configured, arranged and programmed to provide a human perceptible third signal when the measured temperature is indicative of a thermally spent unit load of PCM panels on the pallet.

3. The thermal conditioning logistics system of claim 2 wherein the electronic data processing and display control unit (i) stores the threshold temperature value, (ii) generates the first human perceptible signal when the measured temperature is several degrees below the threshold temperature value, and (iii) generates the second human perceptible signal when the measured temperature is proximate the threshold temperature.

4. The system of claim 1 wherein the data processing and display control unit further includes a system clock, and the data processing and display control unit is programmed to provide a human perceptible third signal when the measured temperature has been at a temperature indicative of a thermally-dampened unit load of frozen PCM panels for a time period longer than a threshold durational value.

5. The thermal conditioning logistics system of claim 4 wherein the electronic data processing and display control unit (i) stores the threshold temperature value, (ii) generates the first human perceptible signal when the measured temperature is several degrees below the threshold temperature value, and (iii) generates the second human perceptible signal when the measured temperature is proximate the threshold temperature.

6. The system of claim 1 wherein the system further includes a display controlled by the display control unit, the display configured and arranged for (i) physical attachment to a pallet whereby an attached display is default transportable with the pallet, and (ii) display of the human perceptible signals generated by the data processing and display control unit.

7. The system of claim 6 wherein the display is physically integrated with the pallet.

8. The system of claim 1 wherein the human perceptible signals are visual signals.

9. The system of claim 8 wherein the first human perceptible signal is blue and the second human perceptible signal is green.

10. The system of claim 1 wherein the system further includes a display physically separate and independent from the pallet.

11. The system of claim 10 wherein the display is releasably attachable to the pallet.

12. The system of claim 1 wherein the temperature sensor, data capture component, and data processing and display control unit are all physically integrated into a single unitary element.

13. The system of claim 1 wherein the temperature sensor is an RFID temperature sensor.

14. The thermal conditioning logistics system of claim 1 wherein the electronic data processing and display control unit (i) stores the threshold temperature value, (ii) generates the first human perceptible signal when the measured temperature is several degrees below the threshold temperature value, and (iii) generates the second human perceptible signal when the measured temperature is proximate the threshold temperature.

15. A thermal conditioning logistics system for PCM panels, comprising:

(a) a pallet operable for supporting a unit load of PCM panels configured and arranged to form an environmental microcosm whose temperature is governed by the temperature of the unit load of PCM panels on the pallet, (b) a temperature sensor operable for periodically measuring the temperature of an environmental microcosm in thermal communication with the sensor and electronically transmitting such measured temperature values, the sensor configured and arranged for integration into a unit load of PCM panels on the pallet whereby the temperature of the environmental microcosm in thermal communication with an integrated temperature sensor is governed by the temperature of the unit load of PCM panels, (c) an electronic data capture component operable for receiving and recording the periodically measured temperature values transmitted by the temperature sensor, and (d) an electronic data processing and display control unit configured, arranged and programmed to compare the measured temperature to a threshold temperature value representative of a temperature at which a given phase change material transitions from deep frozen phase change material to thermally-dampened phase change material, and generate (i) a human perceptible first signal when the measured temperature is indicative of a deep frozen unit load of PCM panels on the pallet, and (ii) a human perceptible second signal when the measured temperature is indicative of a thermally-dampened unit load of frozen PCM panels on the pallet.

16. The system of claim 15 wherein the data processing and display control unit is further configured, arranged and programmed to provide a human perceptible third signal when the measured temperature is indicative of a thermally spent unit load of PCM panels on the pallet.

17. The system of claim 16 wherein the system further includes a display controlled by the display control unit, the display configured and arranged for (i) display of the human perceptible signals generated by the data processing and display control unit in physical proximity to the pallet, and (ii) default transportation with the pallet.

18. The system of claim 16 wherein the human perceptible signals are color coded visual signals.

19. The system of claim 18 wherein the first human perceptible signal is blue, the second human perceptible signal is green and the third human perceptible signal is a color selected from white, red and orange.

20. The thermal conditioning logistics system of claim 16 wherein the electronic data processing and display control unit (i) stores the threshold temperature value, (ii) generates the first human perceptible signal when the measured temperature is several degrees below the threshold temperature value, and (iii) generates the second human perceptible signal when the measured temperature is proximate the threshold temperature.

21. The system of claim 15 wherein the data processing and display control unit further includes a system clock, and the data processing and display control unit is programmed to provide a human perceptible third signal when the measured temperature has been at a temperature indicative of a thermally-dampened unit load of frozen PCM panels for a time period longer than a threshold durational value.

22. The thermal conditioning logistics system of claim 21 wherein the electronic data processing and display control unit (i) stores the threshold temperature value, (ii) generates the first human perceptible signal when the measured temperature is several degrees below the threshold temperature value, and (iii) generates the second human perceptible signal when the measured temperature is proximate the threshold temperature.

23. The system of claim 15 wherein the pallet has load registration elements configured and arranged to encourage formation of a unit load having a predefined stacked arrangement of PCM panels on the pallet.

24. The system of claim 15 wherein at least one of the human perceptible signals is a flashing visual signal and at least one other of the human perceptible signals is a constant visual signal.

25. The system of claim 15 wherein the system further includes a remotely located display controlled by the display control unit for displaying the human perceptible signals generated by the data processing and display control unit correlated to a unique identifier for the pallet associated with the displayed human perceptible signals.

26. The system of claim 15 wherein the temperature sensor is physically integrated with the pallet.

27. The system of claim 15 wherein the temperature sensor is physically separate and independent from the pallet.

28. The system of claim 27 wherein the temperature sensor is releasably attachable to the pallet.

29. The system of claim 15 wherein the pallet, temperature sensor, data capture component, and data processing and display control unit are all physically integrated into a single unitary element.

30. The system of claim 15 wherein the temperature sensor is an RFID temperature sensor.

31. The thermal conditioning logistics system of claim 15 wherein the electronic data processing and display control unit (i) stores the threshold temperature value, (ii) generates the first human perceptible signal when the measured temperature is several degrees below the threshold temperature value, and (iii) generates the second human perceptible signal when the measured temperature is proximate the threshold temperature.

32. A method for thermal management of PCM panels, comprising the steps of:
(a) obtaining a thermal conditioning logistics system according to claim 14,
(b) stacking a unit load of PCM panels containing a phase change material having a known melt temperature onto a pallet so as to form an environmental microcosm whose temperature is governed by the temperature of the unit load of PCM panels on the pallet,
(c) placing the temperature sensor into thermal communication with the environmental microcosm to form a complete pallet,
(d) setting the threshold temperature to a temperature proximate the melt temperature of the phase change material in the PCM panels stacked on the pallet,
(e) placing the complete pallet in a freezer unit set to a temperature several degrees below the threshold temperature for purposes of forming a deep frozen unit load of PCM panels on the complete pallet,
(f) transporting the complete pallet from the freezer unit to a refrigerator unit set to a temperature capable of thermally-dampening deep frozen PCM panels, after the thermal conditioning logistics system generates the human perceptible first signal indicating that the unit load of PCM panels on the complete pallet is a deep frozen unit load of PCM panels, and
(g) transporting the complete pallet from the refrigerator unit to an assembly area for utilization in a shipping container, after the thermal conditioning logistics system generates the human perceptible second signal indicating that the unit load of PCM panels on the complete pallet is a thermally-dampened unit load of frozen PCM panels.

33. The method of claim 32 wherein the threshold temperature is set to the melt temperature of the phase change material in the PCM panels stacked on the complete pallet.

34. The method of claim 32 wherein the refrigerator unit is set to a temperature proximate the melt temperature of the phase change material in the PCM panels stacked on the complete pallet.

35. The method of claim 34 wherein the threshold temperature is set to the melt temperature of the phase change material in the PCM panels stacked on the complete pallet.

36. The method of claim 34 wherein the refrigerator unit is set to a temperature proximate the melt temperature of the phase change material in the PCM panels stacked on the complete pallet.

37. A method for thermal management of PCM panels, comprising the steps of:
(a) obtaining a thermal conditioning logistics system according to claim 31,
(b) stacking a unit load of PCM panels containing a phase change material having a known melt temperature onto the pallet so as to form an environmental microcosm whose temperature is governed by the temperature of the unit load of PCM panels on the pallet,
(c) placing the temperature sensor into thermal communication with the environmental microcosm to form a complete pallet,
(d) setting the threshold temperature to a temperature proximate the melt temperature of the phase change material in the PCM panels stacked on the pallet,
(e) placing the complete pallet in a freezer unit set to a temperature several degrees below the threshold temperature for purposes of forming a deep frozen unit load of PCM panels on the complete pallet,
(f) transporting the complete pallet from the freezer unit to a refrigerator unit set to a temperature capable of thermally-dampening deep frozen PCM panels, after the thermal conditioning logistics system generates the human perceptible first signal indicating that the unit load of PCM panels on the complete pallet is a deep frozen unit load of PCM panels, and (g) transporting the complete pallet from the refrigerator unit to an assembly area for utilization in a shipping container, after the thermal conditioning logistics system generates the human perceptible second signal indicating that the unit load of PCM panels on the complete pallet is a thermally-dampened unit load of frozen PCM panels.

38. A method for thermal management of PCM panels, comprising the steps of:
   (a) obtaining a thermal conditioning logistics system according to claim 3,
   (b) stacking a unit load of PCM panels containing a phase change material having a known melt temperature onto a pallet so as to form an environmental microcosm whose temperature is governed by the temperature of the unit load of PCM panels on the pallet,
   (c) placing the temperature sensor into thermal communication with the environmental microcosm to form a complete pallet,
   (d) setting the threshold temperature to a temperature proximate the melt temperature of the phase change material in the PCM panels stacked on the pallet,
   (e) placing the complete pallet in a freezer unit set to a temperature several degrees below the threshold temperature for purposes of forming a deep frozen unit load of PCM panels on the complete pallet,
   (f) transporting the complete pallet from the freezer unit to a refrigerator unit set to a temperature capable of thermally-dampening deep frozen PCM panels, after the thermal conditioning logistics system generates the human perceptible first signal indicating that the unit load of PCM panels on the complete pallet is a deep frozen unit load of PCM panels,
   (g) transporting the complete pallet from the refrigerator unit to one of:
      (i) an assembly area for utilization in a shipping container provided the thermal conditioning logistics system has generated the human perceptible second signal indicating that the unit load of PCM panels on the complete pallet is a thermally-dampened unit load of frozen PCM panels, and has not generated the human perceptible third signal indicating that the unit load of PCM panels on the complete pallet is a thermally spent unit load of PCM panels, and
      (ii) the freezer unit when the thermal conditioning logistics system has generated the human perceptible third signal indicating that the unit load of PCM panels on the complete pallet is a thermally spent unit load of PCM panels.

39. A method for thermal management of PCM panels, comprising the steps of:
   (a) obtaining a thermal conditioning logistics system according to claim 20,
   (b) stacking a unit load of PCM panels containing a phase change material having a known melt temperature onto the pallet so as to form an environmental microcosm whose temperature is governed by the temperature of the unit load of PCM panels on the pallet,
   (c) placing the temperature sensor into thermal communication with the environmental microcosm to form a complete pallet,
   (d) setting the threshold temperature to a temperature proximate the melt temperature of the phase change material in the PCM panels stacked on the pallet,
   (e) placing the complete pallet in a freezer unit set to a temperature several degrees below the threshold temperature for purposes of forming a deep frozen unit load of PCM panels on the complete pallet,
   (f) transporting the complete pallet from the freezer unit to a refrigerator unit set to a temperature capable of thermally-dampening deep frozen PCM panels, after the thermal conditioning logistics system generates the human perceptible first signal indicating that the unit load of PCM panels on the complete pallet is a deep frozen unit load of PCM panels,
   (g) transporting the complete pallet from the refrigerator unit to one of:
      (i) an assembly area for utilization in a shipping container provided the thermal conditioning logistics system has generated the human perceptible second signal indicating that the unit load of PCM panels on the complete pallet is a thermally-dampened unit load of frozen PCM panels, and has not generated the human perceptible third signal indicating that the unit load of PCM panels on the complete pallet is a thermally spent unit load of PCM panels, and
      (ii) the freezer unit when the thermal conditioning logistics system has generated the human perceptible third signal indicating that the unit load of PCM panels on the complete pallet is a thermally spent unit load of PCM panels.

40. A method for thermal management of PCM panels, comprising the steps of:
   (a) obtaining a thermal conditioning logistics system according to claim 5,
   (b) stacking a unit load of PCM panels containing a phase change material having a known melt temperature onto a pallet so as to form an environmental microcosm whose temperature is governed by the temperature of the unit load of PCM panels on the pallet,
   (c) placing the temperature sensor into thermal communication with the environmental microcosm to form a complete pallet,
   (d) setting the threshold temperature to a temperature proximate the melt temperature of the phase change material in the PCM panels stacked on the pallet,
   (e) placing the complete pallet in a freezer unit set to a temperature several degrees below the threshold temperature for purposes of forming a deep frozen unit load of PCM panels on the complete pallet,
   (f) transporting the complete pallet from the freezer unit to a refrigerator unit set to a temperature capable of thermally-dampening deep frozen PCM panels, after the thermal conditioning logistics system generates the human perceptible first signal indicating that the unit load of PCM panels on the complete pallet is a deep frozen unit load of PCM panels,
   (g) transporting the complete pallet from the refrigerator unit to one of:
      (i) an assembly area for utilization in a shipping container provided the thermal conditioning logistics system has generated the human perceptible second signal indicating that the unit load of PCM panels on the complete pallet is a thermally-dampened unit load of frozen PCM panels, and has not generated the human perceptible third signal indicating that the unit load of PCM panels on the complete pallet is a thermally spent unit load of PCM panels, and
      (ii) the freezer unit when the thermal conditioning logistics system has generated the human perceptible third signal indicating that the unit load of PCM panels on the complete pallet is a thermally spent unit load of PCM panels.

41. A method for thermal management of PCM panels, comprising the steps of:
  (a) obtaining a thermal conditioning logistics system according to claim 22,
  (b) stacking a unit load of PCM panels containing a phase change material having a known melt temperature onto the pallet so as to form an environmental microcosm whose temperature is governed by the temperature of the unit load of PCM panels on the pallet,
  (c) placing the temperature sensor into thermal communication with the environmental microcosm to form a complete pallet,
  (d) setting the threshold temperature to a temperature proximate the melt temperature of the phase change material in the PCM panels stacked on the pallet,
  (e) placing the complete pallet in a freezer unit set to a temperature several degrees below the threshold temperature for purposes of forming a deep frozen unit load of PCM panels on the complete pallet,
  (f) transporting the complete pallet from the freezer unit to a refrigerator unit set to a temperature capable of thermally-dampening deep frozen PCM panels, after the thermal conditioning logistics system generates the human perceptible first signal indicating that the unit load of PCM panels on the complete pallet is a deep frozen unit load of PCM panels,
  (g) transporting the complete pallet from the refrigerator unit to one of:
    (i) an assembly area for utilization in a shipping container provided the thermal conditioning logistics system has generated the human perceptible second signal indicating that the unit load of PCM panels on the complete pallet is a thermally-dampened unit load of frozen PCM panels, and has not generated the human perceptible third signal indicating that the unit load of PCM panels on the complete pallet is a thermally spent unit load of PCM panels, and
    (ii) the freezer unit when the thermal conditioning logistics system has generated the human perceptible third signal indicating that the unit load of PCM panels on the complete pallet is a thermally spent unit load of PCM panels.

\* \* \* \* \*